(No Model.)
G. C. HOWARD.
MEANS FOR CONNECTING HUBS, COUPLINGS, OR THE LIKE TO SHAFTS.
No. 602,181. Patented Apr. 12, 1898.
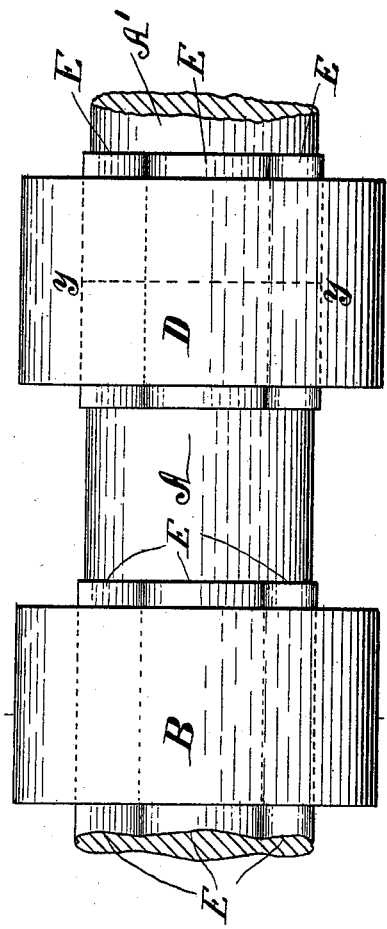
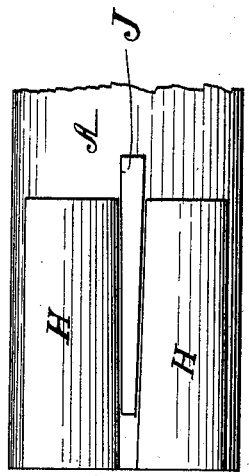
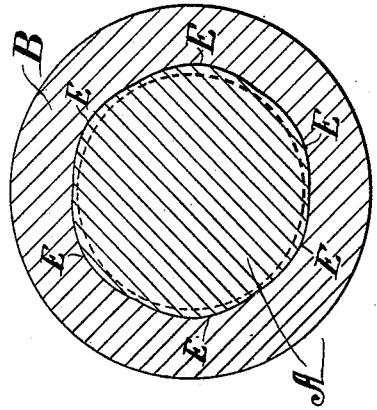
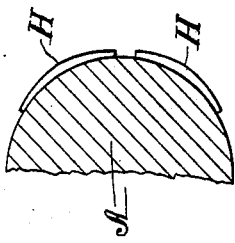
Witnesses.
Walter C. Pusey
A. S. Group
Inventor.
George C. Howard
per Joshua Pusey,
Attorney.

UNITED STATES PATENT OFFICE.

GEORGE CHAPIN HOWARD, OF WALLINGFORD, PENNSYLVANIA.

MEANS FOR CONNECTING HUBS, COUPLINGS, OR THE LIKE TO SHAFTS.

SPECIFICATION forming part of Letters Patent No. 602,181, dated April 12, 1898.

Application filed February 9, 1897. Serial No. 622,660. (No model.)

*To all whom it may concern:*

Be it known that I, GEORGE CHAPIN HOWARD, residing at Wallingford, Delaware county, State of Pennsylvania, have invented new and useful Improvements in Means for Connecting Hubs, Couplings, or the Like to Shafts, of which the following is a full, clear, and exact description, reference being had to the accompanying drawings, in which—

Figure 1 is a side elevation of a shaft, hub, and coupling in which my invention is embodied; Fig. 2, a section on line $x\ x$, Fig. 1; Fig. 3, a transverse section, broken away, of a shaft, &c., showing a modification of a part of the invention; and Fig. 4, a side elevation of the shaft, &c., showing said modification.

The object of my invention is to provide a simple and efficient construction whereby the hubs of pulleys or wheels and couplings may be secured to shafts or axles in such manner that the hubs or couplings will be firmly locked or wedged together by friction against rotative stresses in either direction.

The invention is in the nature of an improvement upon a certain invention of Edward A. Blanton, Jr., which is shown and described in Letters Patent of the United States No. 581,476, granted to said Blanton on the 27th day of April, 1897.

My invention consists of a shaft having on its periphery a series of wedge or cam like projections substantially eccentric with the major axis of the shaft or tangential to its periphery, and which projections are inclined in opposite directions alternately, in combination with a hub or coupling having a bore formed with depressions similar and complementary to the projections upon the shaft, whereby when the hub, &c., is suitably slid upon the shaft its depressions will register with said projections, and when the hub, &c., or the shaft is rotated with relation to the other in either direction the said projections and depressions will frictionally bind and thus maintain the hub, &c., securely in place.

Referring now to the accompanying drawings, forming a part of this specification, and which illustrate what I consider to be the best embodiment of my invention, A is a shaft, upon whose periphery in whole or in part is formed an alternating series—twelve in number in this instance—of wedge-like curvilinear projections of comparatively low pitch. These projections are designated by the letter E, placed opposite the high points or junction of two contiguous projections. They are struck from different centers in opposite directions from their highest to their lowest points, as shown. B is the hub, say, of a wheel or pulley, whose bore is of suitable diameter and is provided with internal depressions complementary in form to the aforesaid projections of the shaft and adapted to fit over the latter more or less closely within certain limits.

In connecting the parts together the hub is slipped upon the shaft and its depressions are brought into line to register with the projections of the shaft. It (the hub) is then slid or forced into place over the part of the shaft having the said projections. If now the hub or the shaft be rotated or attempted to be rotated with relation to each other in either direction, the contacting surfaces of the depressions and projections will interlock and by the wedge or cam like action will bind upon each other and adhere by the cohesion of friction, it being of course understood that the projections and depressions are of such low pitch and gradual ascent as to cause such cohesion between the contact-surfaces when the attempt is made to forcibly turn the one upon the other.

I remark that it is not absolutely essential, but much preferable, that the projections E shall be integral with the shaft.

In Figs. 3 and 4 I show two parts (marked H) that are made separate from and are fitted to the shaft. These two parts embody four of the said projections such as hereinbefore described, rising in opposite directions.

The entire periphery of the shaft is provided with similar separate or detachable projections and the whole held in place by any suitable means when the hub is slid in place upon the shaft, and then the series of projections are keyed together and forced into binding contact by means of a tapering wedge J, that is driven into the interspace left between two adjacent sections of projections, or a number of such wedges entered into interspaces between the sections may be employed.

On the right of Fig. 1 I show a coupling D for the shaft A and a shaft A', the junction of the two ends of said shafts being indicated by the dotted line $y\,y$, the end portions of the shafts being provided with the projections E, and the coupling having the complementary depressions hereinbefore described.

I am aware that there has been patented a device for repairing broken shafts consisting of a shaft either longitudinally fluted or polygonal in cross-section and a clamp-coupling of corresponding internal form. In that construction, however, while the purpose is to connect the broken parts of the shaft in a manner that the two parts will turn together, the contacting surfaces of the coupling and shaft will not cohere and bind and tighten upon each other when the one is turned with relation to the other, which is essential in my construction.

Having thus described my invention, I claim as new and desire to secure by Letters Patent—

The combination of the shaft having the sets of peripheral, similar, eccentric, wedge-like projections, the two projections constituting a set being struck on different centers and in opposite directions from their highest points, and the hub or coupling having the series of internal depressions complementary to said projections; the construction and arrangement being substantially as set forth whereby the surfaces of said projections and depressions, respectively, are adapted to frictionally cohere and bind and tighten upon each other when the hub or coupling, or the shaft, is turned in either direction.

In testimony whereof I affix my signature in presence of two witnesses.

GEORGE CHAPIN HOWARD.

Witnesses:
R. A. KIRKPATRICK,
EDW. M. PEARSON.